Figure 1:
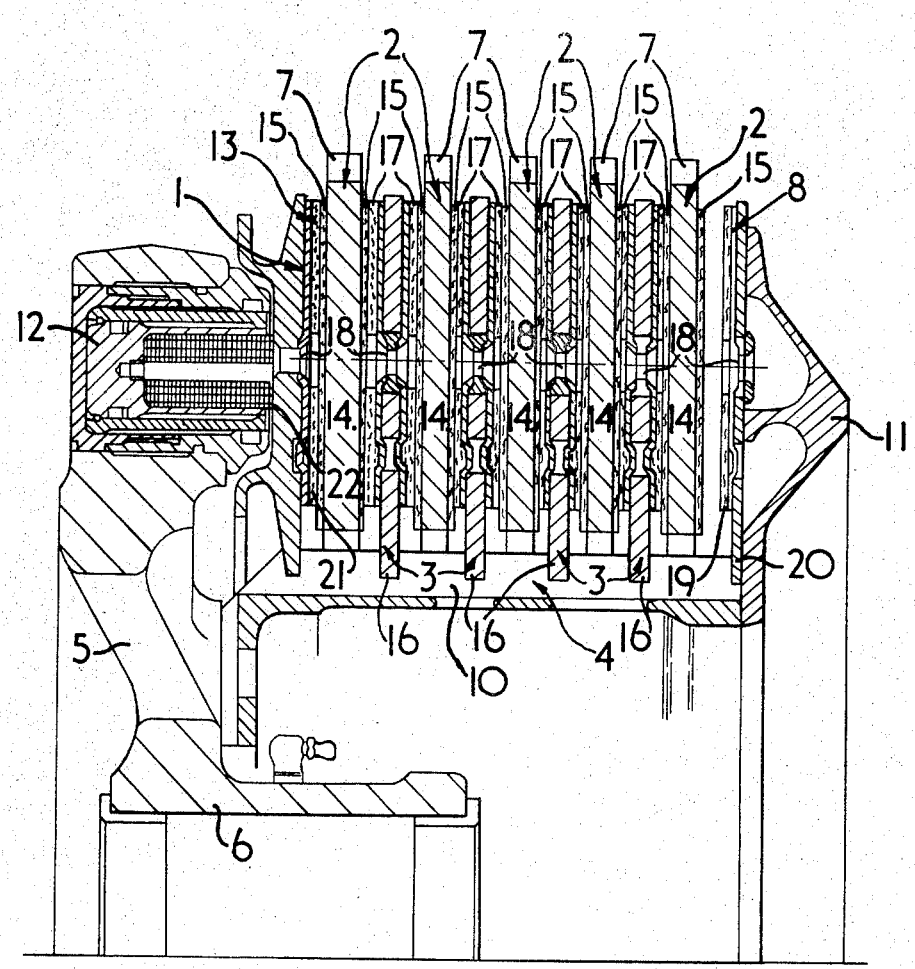

United States Patent [19]
Fisher

[11] 3,731,776
[45] May 8, 1973

[54] FRICTION MECHANISMS

[76] Inventor: Ronald Fisher, c/o Fort Dunlop, Erdington, Birmingham 24, Rudby, England

[22] Filed: Mar. 15, 1971

[21] Appl. No.: 124,103

[30] Foreign Application Priority Data
Mar. 19, 1970 Great Britain.....................13,237/70

[52] U.S. Cl........192/107 M, 188/251 A, 188/251 M
[51] Int. Cl. ..........................F16d 13/60, F16d 69/02
[58] Field of Search ....................192/107 M, 70.14; 188/251 A, 251 M

[56] References Cited

UNITED STATES PATENTS 3,205,989  9/1965  Mantey.............................192/84 C

FOREIGN PATENTS OR APPLICATIONS 1,329,728  12/1963  France...........................188/251 M
238,206  4/1962  Australia........................192/107 M Primary Examiner—Allan D. Herrmann
Attorney—Stevens, Davis, Miller & Mosher

[57] ABSTRACT

A friction mechanism in which a pair of relatively rotable friction members are arranged to be moved into and out of engagement with each other by an actuating mechanism. The surfaces of engagement of the friction members are each provided with a facing of sintered friction material comprising a matrix constituent and a particulate constituent dispersed within the matrix constituent. At least one of the facings of friction material incorporates a boride as a particulate constituent, of which the following is a specification.

9 Claims, 2 Drawing Figures

FRICTION MECHANISMS

This invention relates to friction mechanisms and in particular, though not exclusively, to a friction mechanism in the form of an aircraft brake.

According to one aspect of the present invention a friction mechanism comprises a pair of relatively rotatable friction members capable of movement into and out of engagement with each other, an actuating mechanism capable of moving the friction members into engagement with each other, the surfaces of engagement of the members each being provided with a facing of sintered friction material comprising a matrix constituent and a particulate constituent dispersed within the matrix constituent, at least one of the facings of friction material incorporating a boride as a particulate constituent.

According to a further aspect of the present invention a friction mechanism comprises a pair of relative rotatable friction members capable of movement into and out of engagement with each other, an actuating mechanism capable of moving the friction members into engagement with each other, the surfaces of engagement of the members each being provided with a facing of sintered friction material comprising a matrix constituent and a boride as a particulate constituent dispersed within the matrix constituent.

The friction members may, for example, be in the form of a pair of aircraft brake annular rotor and stator members.

The term "boride" as used in this specification includes compounds consisting of boron and a metal and compounds consisting of boron and carbon.

The percentage by weight of boride in the friction material containing a boride used in a friction mechanism in accordance with the present invention is not limited to a particular value, but, for ease of handling during sintering, the percentage by weight of boride is preferably of the order of between 1 to 25 per cent by weight of the friction material.

Figure 2:
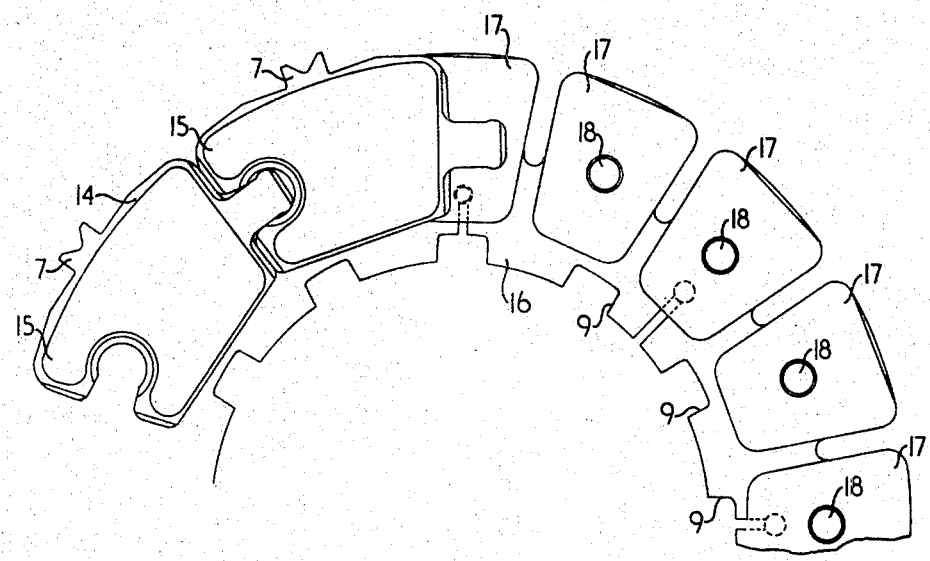

One embodiment of the invention will now be described by way of example with reference to the accompanying drawings in which:

FIG. 1 shows a cross-sectional view of a friction mechanism in accordance with the present invention in the form of a multi-plate aircraft disc brake, the cross-sectional view being taken on a plane at right angles to the planes of the brake discs and FIG. 2 shows part of a rotor and stator for use in a brake of the kind shown in FIG. 1.

A friction mechanism in the form of a multi-plate aircraft disc brake 1 (see FIG. 1) comprises an assembly of relatively rotatable friction members constituted by a series of annular rotor 2 and stator 3 brake discs mounted coaxially with and in surrounding relation to the hub of an aircraft wheel.

The rotor and stator discs are mounted in interleaved relationship on a torque tube 4 projecting axially from a torque member 5 secured to the non-rotatable wheel hub 6.

Each rotor disc 2 is keyed to the aircraft wheel by means of drive dogs 7 at the radially outer circumference of the disc engaging in corresponding keyways (not shown) formed in the wheel so that the disc is axially movable relative thereto.

Apart from the axially outermost stator disc 8, each stator disc 3 is keyed to the torque tube 4 by means of drive dogs 9 (see FIG. 2) at the radially inner circumference of the disc engaging splines 10 formed on the tube, so that the disc is axially movable relative to the tube. The axially outermost stator disc 8 is mounted in an axially fixed position on an annular reaction member 11 in the form of a flange secured to the torque tube at the axially outermost end thereof.

An actuating mechanism for urging the rotor and stator discs into engagement with one another is provided in the form of a series of piston and cylinder assemblies 12 mounted on the torque member so that the pistons thereof are engageable with the axially innermost stator disc 13.

When fluid is supplied to the cylinders, the axially movable rotor and stator discs are moved by the pistons axially outwardly until the stator disc on the reaction member prevents further movement, and the rotor discs are clamped between the stator discs in frictional engagement therewith.

Each rotor disc 2 comprises an assembly of steel segments 14 (see FIG. 2) which interlock in the manner of jig-saw pieces. A rotor disc of this kind is more fully described in our U.K. Patent specification No. 931,031. Two friction facings 15 in the form of moulded pads of sintered friction material are located one on each side of each segment of the rotor disc and bonded directly thereto.

The axially movable stator discs 3 are each in the form of a rigid steel annulus 16 (see FIG. 2) having a plurality of friction facings 17 secured thereto at closely circumferentially-spaced positions on both sides thereof. Each stator friction facing comprises a moulded pad of sintered friction material bonded to a steel backing plate which itself is rivetted 18 to the rigid steel annulus.

The stator disc 8 which is secured to the reaction member 11 comprises a plurality of sintered friction facings 19 rivetted to an annular steel backing plate 20 which is itself secured to the reaction member 11. The friction facings are constructed and arranged in a manner similar to the stator friction elements described in the last preceding paragraph.

The axially innermost stator disc 13 is constructed and arranged in a manner otherwise similar to the other axially movable stator discs, but is provided with sintered friction facings 21 on its axially outermost side face only, its other side face 22 being formed to cooperate with the brake-applying pistons 12.

The friction facings provided on the rotor and stator members, which frictionally engage one another when the brake is applied, comprise a friction material comprising a matrix constituent and a particulate constituent dispersed within the matrix constituent, the friction material of at least one of each pair of engaging friction facings containing a boride as a particulate constituent.

The friction material matrix may consist of one or more metals or of polymeric material.

Where a metallic matrix is employed, the matrix may comprise one or more metals chosen from the group consisting of iron, copper, nickel, cobalt and manganese. The matrix may also comprise one or more metals chosen from the group consisting of tin, zinc, lead, bismuth and antimony in an amount constituting up to 40 per cent by weight of the matrix.

Where a polymeric matrix material is employed the matrix may comprise organic polymers, for example a phenolformaldehyde thermosetting polymer, or inorganic polymers such as phospho-nitrillic chloride.

The boride of the friction material may, for example, be a boride of one of the following elements: zirconium, titanium, molybdenum, chromium, niobium, tantalum, tungsten and carbon. Other borides may also be employed.

Friction modifying agents which may be incorporated in the friction material include silicon nitride, graphite, molybdenum disulphide, cuprous sulphide, metal phosphides, silica, aluminum orthophosphate, magnesium pyrophosphate, manganese pyrophosphate and inorganic fibrous materials.

These materials are added to impart specific properties to the friction material such as wear resistance and smooth rubbing characteristics.

The friction material may be manufactured as follows. The constituent materials are intimately mixed in powder form, compacted at a pressure of between 3 to 50 tons per square inch to form a briquette, and then sintered in a non-oxidizing atmosphere to produce a coherent solid. The sintering time and temperature depend upon the particular substances used in the friction material but temperatures in the region of 1000° C and times of the order of 1 hour are suitable.

Examples A to G of friction materials including a boride and a metal matrix which are suitable for use in a friction mechanism in accordance with the present invention are given below in Table I. The proportions of the constituent materials given in Table I are given in terms of percentages by weight.

TABLE I

| Ingredients | A | B | C | D | E | F | G |
|---|---|---|---|---|---|---|---|
| Chromium Diboride | 1.0 | 2.0 | 2.3 | 2.3 | 2.3 | 4.6 | 15.0 |
| Silicon Nitride | 2.3 | 15.0 | 1.0 | 2.3 | 2.3 | 2.3 | 2.0 |
| Iron | 79.9 | 68.5 | 79.9 | 79.0 | 80.6 | 77.7 | 68.5 |
| Graphite | 8.4 | 7.2 | 8.4 | 8.0 | 9.0 | 8.0 | 7.2 |
| Molybdenum Disulphide | 2.8 | 2.4 | 2.8 | 2.8 | 3.0 | 2.8 | 2.4 |
| Ferrotungsten | 5.6 | 4.8 | 5.6 | 5.6 | 2.8 | 5.6 | 4.8 |

The friction materials given above in Table I were tested in a friction mechanism in accordance with the present invention and the results of a number of these tests on examples D and F of Table I are set out below in Table II.

TABLE II

| Horsepower loading ft.lb/in²/sec. | Example D | | Example F | | Example X | |
|---|---|---|---|---|---|---|
| | μ | W | μ | W | μ | W |
| 600 | 0.35 | 0.17 | 0.40 | 0.09 | 0.29 | 0.15 |
| 900 | 0.31 | 0.20 | 0.32 | 0.21 | 0.24 | 0.22 |

In the above table and in Table IV below the results under heading μ are the values recorded for the coefficient of friction and those under the heading W are the average values of brake pad wear recorded per stop expressed in inches ( × 10⁻³).

The friction mechanisms used in these tests was a 6½ inch diameter disc brake mounted on an inertia wheel dynamometer and provided with friction members equipped with identical friction facings on all engaging surfaces. The test conditions corresponding to the various horsepower loadings imposed on the test examples are set out below in Table III.

TABLE III

| Horsepower loading ft.lb/in²/sec. | 600 | 900 |
|---|---|---|
| Speed of rotation of dynamometer at commencement of braking (r.p.m.) | 2,500 | 2,800 |
| Stopping time (secs.) | 24 | 18 |
| Energy Absorbed per Stop (ft.lbs.) | .431 × 10⁶ | .541 × 10⁶ |

The brake was allowed to cool to room temperature between each successive stop. The testing of each example at each horsepower loading comprised 10 stops at the particular loading in question followed by several lower energy stops to assess the behavior of the material at lower energy inputs.

In order to provide a comparison of the results of the tests on examples D and F with the results to be expected from a sintered friction material not containing a boride subjected to test under the same conditions, the test results of an example X have been added to Table II. The proportions by weight of example X were silicon nitride 2.3 percent, iron 80 percent, graphite 9 percent, molybdenum disulphide 3 percent, and ferrotungsten 5.7 percent. The friction materials D and F were also tested under the same conditions against steel, that is one of each pair of engaging surfaces was arranged to comprise a sintered friction material and the other engaging surface of each pair was arranged to be a steel surface. The results of the tests of examples D and F tested against steel are shown in Table IV below:

TABLE IV

| Horsepower loading ft.lb/in²/sec. | Example D | | Example F | |
|---|---|---|---|---|
| | μ | W | μ | W |
| 600 | 0.31 | 0.29 | 0.30 | 0.30 |
| 900 | 0.26 | 0.26 | 0.24 | 0.19 |

Examination of the results of Table II shows the definite improvements in friction material performance obtained by the addition of a boride. The results of examples D and F in Table II show a marked improvement in coefficient of friction over the non boride-containing example X and an improved or substantially maintained wear rate.

A comparison of tables II and IV clearly shows the considerable improvements in friction material performance to be obtained by using boride-containing friction materials on all engaging surfaces as opposed to a boride against steel arrangement.

It has been found that a friction mechanism according to the invention has a very much better performance than otherwise similar friction mechanisms in which no boride is present. It is believed that the reason for this unexpected advantage is that the boride constituent of the friction material of one of the engaging facings of friction material synergistically co-operates with the particulate constituent or with the matrix constituent, or with both the matrix constituent and the particulate constituent of the other engaging facing of friction material, against which it rubs, to produce a significantly higher coefficient of friction while maintaining satisfactory resistance to wear.

It has been found that a particularly effective friction mechanism is obtained by use of friction material comprising a matrix (for example a matrix of iron), a boride, a lubricant such as graphite or molybdenum disulphide or a mixture of graphite and molybdenum disulphide, together with silicon nitride. The quantity of silicon nitride is preferably between 50 per cent and 200 per cent by weight of the boride.

Having now described my invention — What I claim is:

1. A friction mechanism comprising a pair of relatively rotatable friction members capable of movement into and out of engagement with each other, an actuating mechanism capable of moving the friction members into engagement with each other, the surfaces of engagement of the members each being provided with a facing of sintered friction material comprising a matrix constituent and a particulate constituent dispersed within the matrix constituent, wherein each sintered friction material comprises a matrix constituent and a boride as a particulate constituent dispersed within the matrix constituent.

2. A friction mechanism according to claim 1 wherein the boride containing friction facing or facings contains or contain a boride of one of the following elements: zirconium, titanium, molybdenum, chromium, niobium, tantalum, tungsten and carbon.

3. A friction mechanism according to claim 1 wherein the proportion of boride in the boride containing friction facings is from 1 per cent to 25 per cent by weight.

4. A friction mechanism according to claim 1 wherein a friction facing contains at least one friction modifying agent selected from the group consisting of silicon nitride, graphite, molybdenum disulphide, cuprous sulphide, metal phosphides, silica, aluminum orthophosphate, magnesium pyrophosphate, manganese pyrophosphate and inorganic fibrous materials.

5. A friction mechanism according to claim 1 wherein a friction facing comprises a matrix of metal or metals selected from the group consisting of iron, copper, nickel, cobalt and manganese.

6. A friction mechanism according to claim 5 wherein a friction facing comprises a matrix also including one or more metals selected from the group consisting of tin, zinc, lead, bismuth and antimony.

7. A friction mechanism according to claim 1 wherein a friction facing comprises a matrix of polymeric material.

8. A friction mechanism according to claim 7 wherein a friction facing comprises a matrix of phenol-formaldehyde.

9. A friction mechanism according to claim 7 wherein a friction facing comprises a matrix of phospho-nitrillic chloride.

* * * * *